J. A. PRINDLE.
Harrow
No. 227,445.
Patented May 11, 1880.
2 Sheets—Sheet 1.
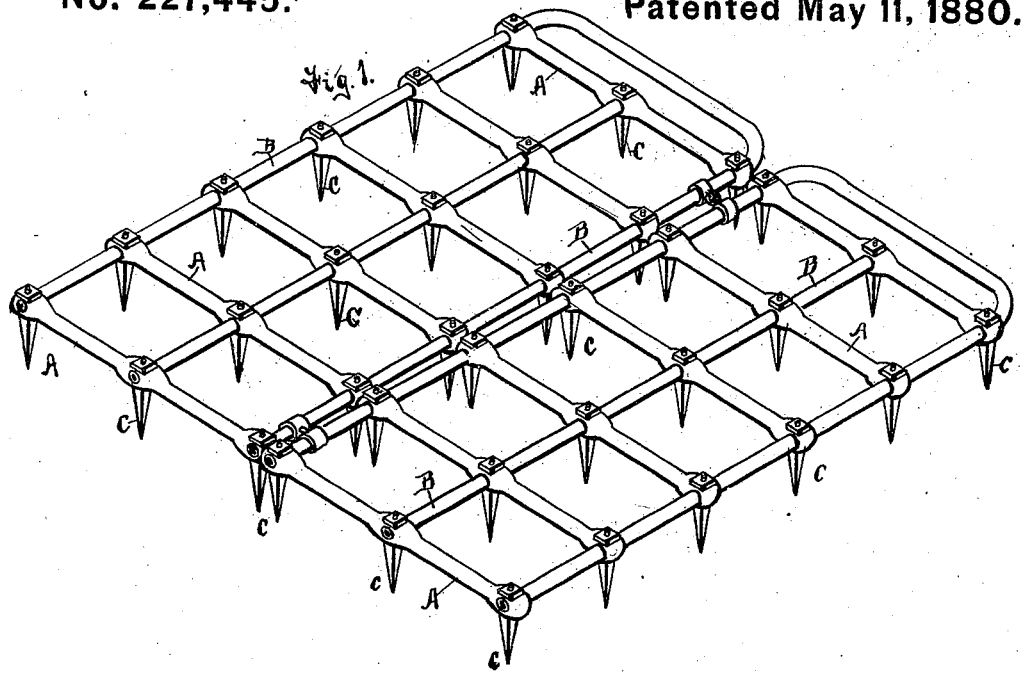
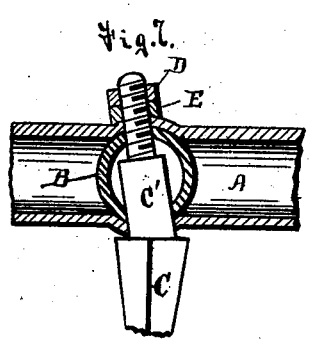
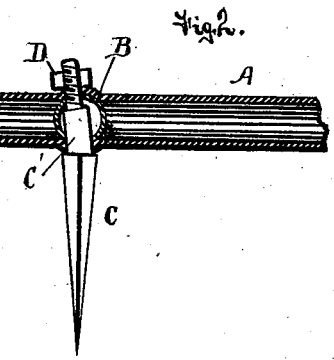
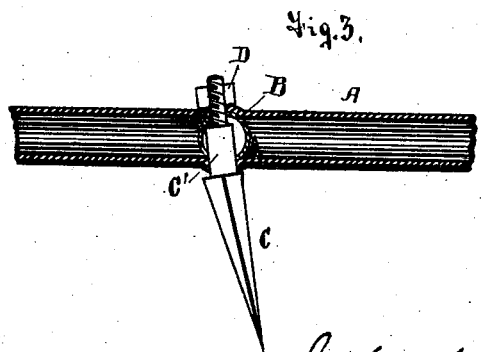
WITNESSES
Frank M. Faber.
Willard Fracker.
INVENTOR
John A. Prindle
By Leggett & Leggett
ATTORNEYS 2 Sheets—Sheet 2.

J. A. PRINDLE.
Harrow.

No. 227,445. Patented May 11, 1880.

WITNESSES
Frank M. Faber
Willard Fracker

INVENTOR
John A. Prindle
By Leggett & Leggett
ATTORNEYS

N. PETERS, PHOTO-LITHOGRAPHER, WASHINGTON, D. C.

UNITED STATES PATENT OFFICE.

JOHN A. PRINDLE, OF CLEVELAND, OHIO.

HARROW.

SPECIFICATION forming part of Letters Patent No. 227,445, dated May 11, 1880.

Application filed February 9, 1880.

*To all whom it may concern:*

Be it known that I, JOHN A. PRINDLE, of Cleveland, in the county of Cuyahoga and State of Ohio, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to harrows; and it consists in a harrow-frame formed of intersecting wrought-iron pipes and provided with harrow-teeth, which are inserted through two pipes at their point of intersection.

My invention further consists in a harrow-frame formed of intersecting wrought-iron pipes, the outer pipes being slotted and enlarged at the points of intersection, and the pipes welded together.

My invention further consists in a harrow-frame formed of intersecting wrought-iron pipes welded together at their points of intersection, in combination with laterally-adjustable harrow-teeth secured to the harrow-frame through the points of intersection of the pipes.

Figure 4:
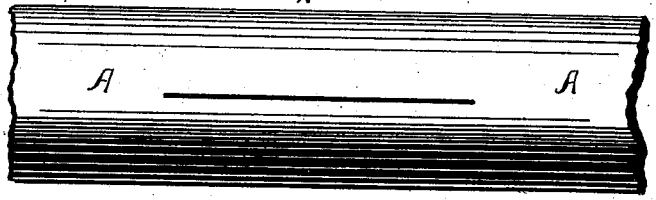
Figure 5:
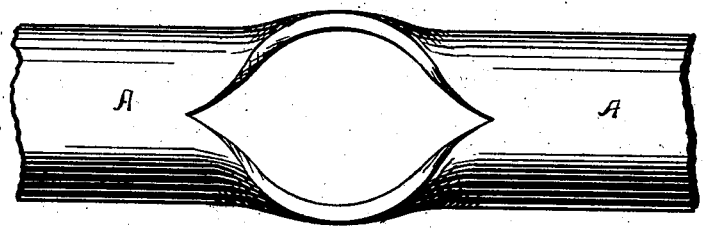
Figure 6:
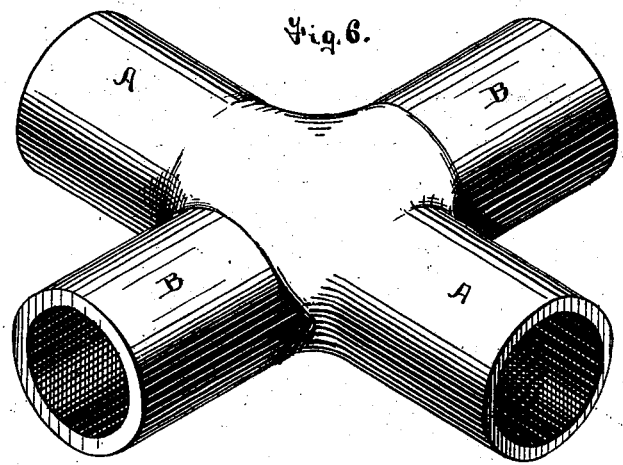

In the drawings, Figure 1 is an isometric view of a harrow constructed according to my invention. Fig. 2 is a view, in longitudinal vertical section, representing, in detail, a single tooth as adjusted to its vertical position. Fig. 3 is a similar view, showing the same tooth adjusted to its inclined or angular position. Figs 4, 5, and 6 are explanatory figures, intended to illustrate my method of uniting the intersecting portions of a tubular wrought-iron harrow-frame, as will hereinafter more fully and at large appear. Fig. 7 is an enlarged view, in vertical section, of the point of intersection of two pipes of the harrow-frame, and a view, in side elevation, of the upper end of a harrow-tooth.

A B, Fig. 1, is a tubular wrought-iron harrow-frame, and C C are the teeth, which are attached to the frame at the intersecting points of the tubes A B. This frame may be of any desired general shape, such as square, rectangular, triangular, diamond-shaped, or what not. The form shown in Fig. 1 of the drawings approaches the rectangular, but it widens from end to end, so that the teeth from front to rear shall not track alike.

The frame may be made either of two sections, hinged or linked together, as shown in Fig. 1, or it may be constructed in a single section, or in more than two sections, according to requirements or fancy.

I will now explain my method of making my tubular frame.

The tube A, at each point where a tube, B, is to intersect, is slit with a short longitudinal slit, (see Fig. 4,) and the tube is opened or spread (see Fig. 5) wide enough to admit of the introduction of the pipe B. (See Fig. 6.) After this the pipes A B, at their intersection, are welded together in any suitable way, preferably, however, by being placed between shaping-dies that shall produce a neat-looking joint that will be uniform in appearance with all of its fellows. When thus united, the frame, at each intersecting point, is perforated to admit the shanks of the teeth C. These perforations are not made at right angles with the plane of the frame, but at an angle thereto, for reasons hereinafter appearing.

The teeth C, it will be noticed, are each formed with a shank bent or inclined at an angle from the longitudinal axis of the tooth-body. This shank C', if adjusted as shown in Figs. 2 and 7 of the drawings, will cause the tooth to stand in a vertical position; but when reversed and adjusted as shown in Fig. 3 of the drawings, then the tooth will, as shown, stand in an inclined position. This is due to the angular or inclined construction of the shank C' and of the perforation or bearing which it has in the harrow-frame.

In order to maintain the teeth C more firmly and surely in position, I may provide a washer, E, between the upper surface of the frame and the retaining-nut D. This washer has its nether surface formed in counterpart of the shape of the frame upon which it bears. Fig. 7 of the drawings illustrates this washer E, nut D, frame, and tooth as united in my device.

What I claim is—

1. The combination, with a harrow-frame formed of intersecting wrought-iron pipes, of harrow-teeth, each tooth being inserted through two pipes at their point of intersection, substantially as set forth.

2. A harrow-frame formed of crossed or intersecting wrought-iron pipes, the outer pipes being slotted and enlarged at the points of intersection, and the pipes welded together, substantially as set forth.

3. The combination, with a harrow-frame formed of intersecting wrought-iron pipes welded together at their points of intersection, of laterally-adjustable harrow-teeth secured to the harrow-frame through the points of intersection of the pipes, substantially as set forth.

In testimony whereof I have signed my name to this specification in the presence of two subscribing witnesses.

JOHN A. PRINDLE.

Witnesses:
JNO. CROWELL, Jr.,
LEVERETT L. LEGGETT.